United States Patent [19]

Baumann

[11] Patent Number: 4,836,321

[45] Date of Patent: Jun. 6, 1989

[54] BRACING OF VEHICLE BODY STRUCTURES ON A RESILIENTLY MOUNTED FRONT ENGINE MOTOR VEHICLE

[75] Inventor: Karl-Heinz Baumann, Bondorf, Fed. Rep. of Germany

[73] Assignee: Daimler-Benz Aktiengesellschaft, Stuttgart, Fed. Rep. of Germany

[21] Appl. No.: 171,804

[22] Filed: Mar. 22, 1988

[30] Foreign Application Priority Data

Mar. 31, 1987 [DE] Fed. Rep. of Germany ....... 3710808

[51] Int. Cl.$^4$ .............................................. B60K 28/00
[52] U.S. Cl. .................................. 180/232; 296/188; 296/189; 180/291
[58] Field of Search ............... 180/232, 294, 291, 300, 180/311, 312, 298; 280/784; 296/188, 189

[56] References Cited

U.S. PATENT DOCUMENTS 3,927,730 12/1975 Winslow ............................ 296/189
4,089,385 5/1978 Payoux .................................. 180/232

FOREIGN PATENT DOCUMENTS 2203690 8/1973 Fed. Rep. of Germany .
2506303 8/1976 Fed. Rep. of Germany .

Primary Examiner—Charles A. Marmor
Assistant Examiner—Karin Tyson
Attorney, Agent, or Firm—Barnes & Thornburg

[57] ABSTRACT

The invention relates to bracing of vehicle body structures that are deformed with absorption of energy upon collision wherein a resiliently front mounted engine of a motor vehicle has connected thereto a longitudinally extending tension band fastened to the vehicle body structure laterally adjacent to the engine which tension band is extended upon collision and wherein the bracing function of the front engine is largely independent of the course of deformation of the car front in the case of a frontal collision, and wherein the tension band is constructed as a flexible traction cable at least along a part of its length and wherein along its length it is provided with a stress absorbing means for the absorption of forces after an intended partial deformation of the vehicle body structure associated with it.

9 Claims, 2 Drawing Sheets

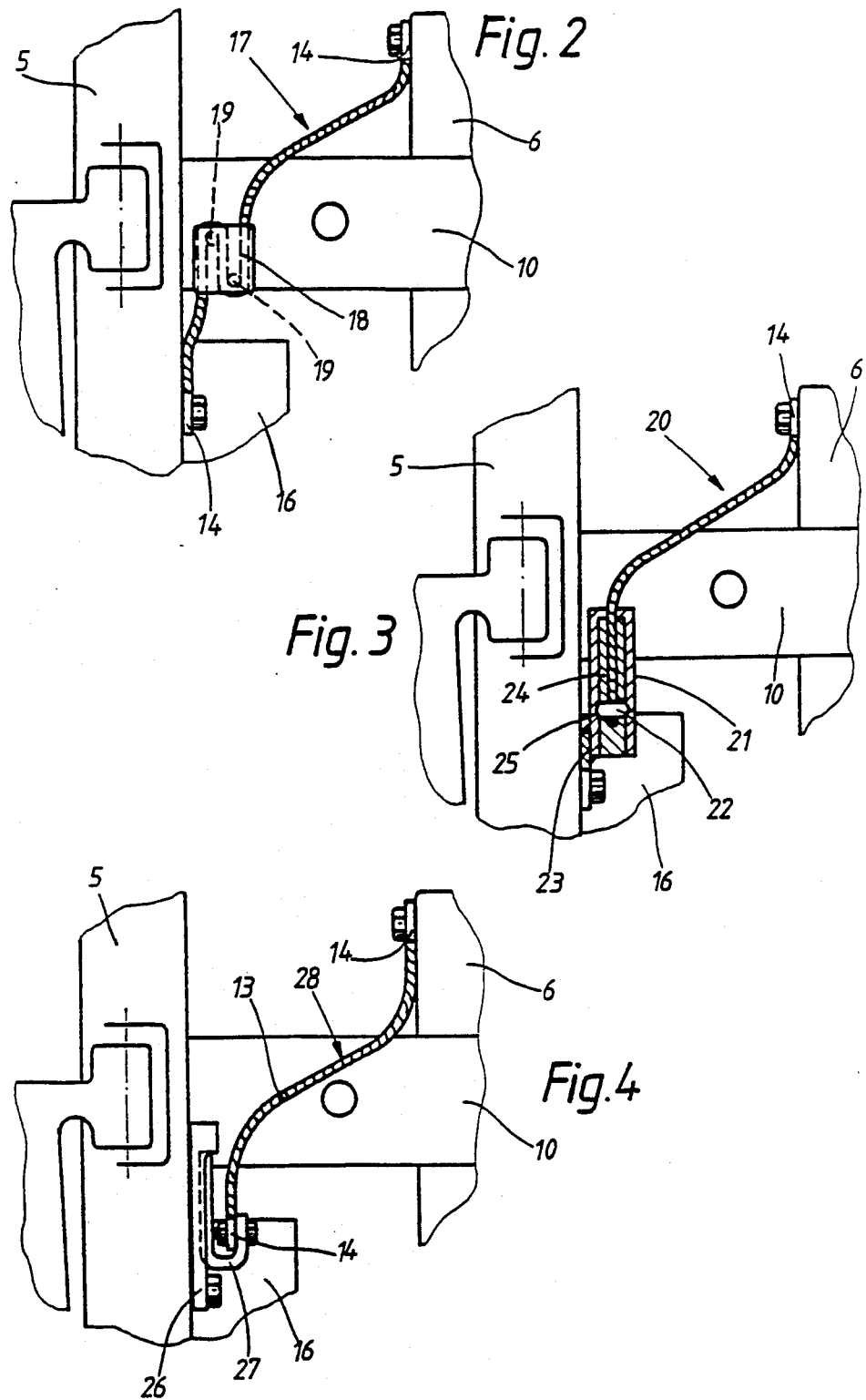

BRACING OF VEHICLE BODY STRUCTURES ON A RESILIENTLY MOUNTED FRONT ENGINE MOTOR VEHICLE

BACKGROUND AND SUMMARY OF THE INVENTION

The invention relates to the bracing of deformable vehicle body structures of a resiliently front mounted engine of a motor vehicle, wherein after a partial deformation of the car front in the case of a frontal collision, a longitudinally extending tension band, fastened to the vehicle body structure laterally adjacent to the engine, is braced frictionally on the engine side of the vehicle.

Bracing of the engine of a motor vehicle is known from DE-OS 2,506,303. In this case, the bracing is formed by a transverse beam strip iron which extends from the front portion of the engine gear box unit and is attached rigidly to longitudinal side members of the associated motor car, laterally adjacent to the engine on both sides.

In the cae of a frontal collision with an obstacle, this transverse beam arrangement results in both longitudinal side members being utilized as crush zones, largely independently of the degree of the length of the beam, and in the case of major deformations of the car front, the engine unit is displaced toward the rear along with the side members until the rear end face of the engine block is braced against the end wall of the vehicle body located at the passenger compartment safety cell, and involves the latter in the absorption of impact energy. These deformations in the central region of the end wall have a disadvantageous effect upon the so-called survival space in the interior of the safety cell in the case of substantial deformations of the safety cell.

However, in the case of a non head-on collision, which occurs frequently, the above design prevents deformation energy from being absorbed by that half of the car front structure on the non-collision side.

In this case, collapsing of the end wall into the foot space of the safety cell on the collision side would endanger the preservation of the necessary passenger survival space and would be expected even in the case of relatively low collision velocities. Because adequate installation space for a crossbar-like collision absorption mechanism will frequently not be present in the engine compartment of motor cars in front of the engine, DE-OS No. 2,506,303 provides as an alternative to the known bracing, a plurality bracing for the engine laterally.

A lateral engagement of a support band, to fasten to longitudinal members with a loop-shaped strip iron which comes into abutment with a projection protruding laterally from the engine in the course of the deformation of the car front was provided.

Although the resiliently mounted engine then remains freely movable relative to the vehicle body surrounding it, such an arrangement can only be designed for a precisely defined course of deformation of the car front.

However, since the course of deformation of the car front varies considerably according to the direction of impact with the obstacle, a reliable bracing function on the engine is not immediately ensured.

For the reasons explained supra, it is an underlying object of this invention to provide a bracing of the vehicle body structure, deformed with absorption of energy on a resiliently mounted front engine of motor vehicles, so that the braking function of the front engine can occur largely independently of the direction of deformation of the car front in the case of a frontal collision, and with the object of using a tension band arrangement that requires little installation space.

According to the invention, the tension band is constructed as a flexible tension cable at least along a part of its length and is connected permanently to the engine and the vehicle body at its ends by fasteners. The tension band is retained between its fasteners so that it is tensioned with absorption of the forces after the conclusion of the intended partial deformation of the vehicle body structure associated with it.

The normal resilient mounting of the engine to allow for vibration is not prejudiced by this mounting arrangement, although a permanent connection exists between the engine and the vehicle body.

The flexible bracing also prevents a noticeable increase in the transmission of sound which would occur through a solid connection from the engine to the vehicle body.

It also has the advantage that the tension band need be oriented only in the longitudinal direction of the vehicle while connected between the engine and side wall of the engine compartment, appropriate to the installation space available. The collision force-absorbing tensioned position of the tension band occurs only after a longitudinal deformation of the side wall of the vehicle body by more than 30 mm.

Different mountings of the tension band are advantageous according to the location of the engine in the motor car. In the case of an engine installed offset to the right in the engine compartment, it may be sufficient if the tension band is arranged on the left-hand side between a longitudinal side member and the opposite side of the engine from the longitudinal side members, because there is a high probability that the engine will be involved in stress on its end face in the case of a right-hand offset collision of the motor car.

It is also possible to select the fastening points so that the engine unit is pivoted somewhat about an almost vertical axis under tensile loading by the tension band. In the case of an offset crash, this produces an oblique displacement of the engine unit out of its position parallel with respect to the median longitudinal axis towards the tension band side, which gives the engine unit a direction towards the side of the motor car remote from the crash.

Although a drive side offset collision is substantially more frequent than one on the passenger side, a tension band may be provided on each of the two sides of the engine, particularly in the case of a centrally arranged engine unit. In this case, a tension band arrangement oriented in mirror image to the median longitudinal axis of the motor vehicle is selected, with the required bracing behavior of the engine being obtained irrespective of the offset collision side of the motor vehicle.

The tension band arrangement can also be used simultaneously as an electrical grounding cable from the engine to the vehicle body. This attribution of a dual function to the tension band achieves an economy in weight compared to fitting the tension band in addition to a grounding cable.

If the tension band is required to be attached on the engine side to components which are made of cast materials, then the self-damping which exists per se in the case of wire cables as a tension band is no longer sufficient to prevent the cable from being torn out of the casting in the course of the abrupt transmission of tensile forces which occurs in the course of the tensioning process of the tension band. Thus, it is necessary in this case for a part of the existing tensioning length to be formed by a deformation element, which deforms plastically in the final phase of the tensioning process of the tension band, so that the tensile stress can be transmitted to the cast material more uniformly and without an extreme tension peak. With appropriate dimensioning of the deformation element, it is possible to prevent the engine side tension band fastening means from being torn apart.

A number of types of construction for such a deformation element may be used. The deformation element may comprise having a central region of the flexible tension band wound in meander shape around two transverse bolts of a cable joint in loops, which are pressed together by means of the cable joint, so that the tension band is elongated into its stretched tensioning position only by plastic bending open of the cable joint.

Alternatively, an end of the tension band could be formed as a cylinder arranged on the vehicle body with a displacer piston located therein and which is connected to the tension band in the manner of a piston rod, and wherein the displacer piston can be drawn into its limit position in the cylinder counter to plastic material deformation caused by a plastic material in the cylinder.

Another alternative would be to have two juxtaposed flat irons provided as tension band receivers and which are mutually flexurally rigidly connected toward the front end of the vehicle and wherein one of the flat irons is fastened at its rear end to the vehicle body and the other flat iron is fastened at its rear end to the engine by means of the tension band so that the pair of flat irons are spreadable in their flexurally rigid connection region with a plastic deformation.

However, combinations of tension cables with other deformation elements of comparable absorptive capacity are also conceivable.

Other objects, advantages and novel features of the present invention will become apparent from the following detailed description of the invention when considered in conjunction with the accompanying drawings.

BRIEF DESCRIPTION OF THE DRAWINGS

FIGS. 2 through 4 show different embodiments of the tension band arrangement according to FIG. 1 in larger scale.

DETAILED DESCRIPTION OF THE DRAWINGS

Figure 1:
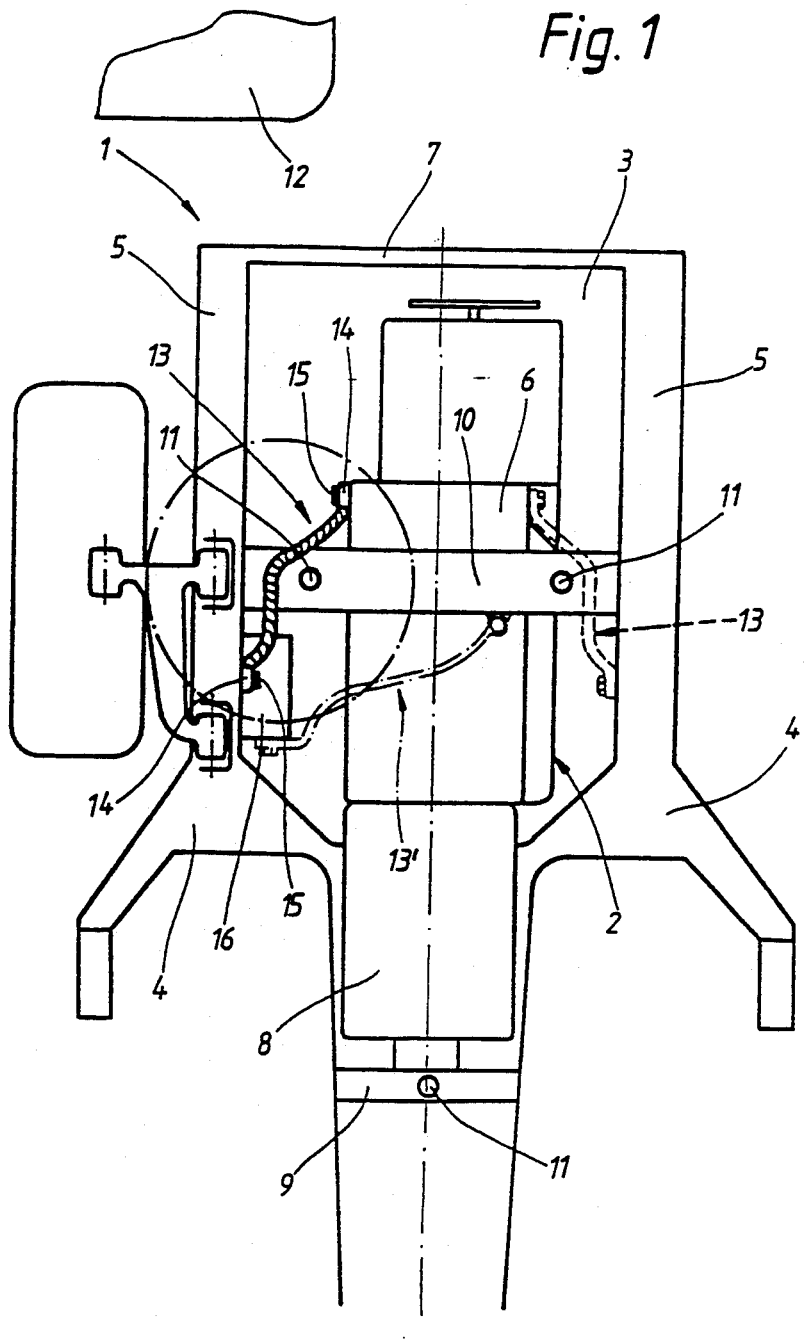
FIG. 1 shows a diagrammatic bottom plan of the engine compartment of a motor car with a tension band arrangement.

Referring now to the drawings wherein like reference numerals are used to designate like parts and more particularly to FIG. 1 wherein there is shown a front 1 of a motor car of conventional drive, not shown in detail, which has longitudinal side members 5 extending on both sides of an engine unit 2 as supporting structure. These side members 5 are straight at the front of the vehicle and are constructed as bifurcated members 4 in the region of an end wall between the engine compartment 3 and the passenger safety cell. The straight side members 5 extend parallel to the longitudinal axis of the vehicle engine 6 and are mutually connected at the front end of the vehicle by a light transverse member 7. A conventional end plate and customary bumper system (not shown) are arranged in front of the end transverse member 7, and are braced by the side member 5.

The engine 6 is fixedly attached to a gear box 8 on its rearwardly facing end and is mounted as a single engine unit 2 on the vehicle. This mounting is effected by a central tunnel end cross-member 9 located rearwardly of the vehicle behind the gear box 8 and by an engine cross-member 10 which is attached between the unit members 5 and extending beneath the engine 6. Bearing units 11 of known resilient construction produce a reliable three-point suspension for the engine unit 2, which three-point suspension admits of movement of the engine unit 2 relative to the vehicle body.

The engine 6 is installed off center to the right, so that its lateral spacing from the right-hand side member 5 is definitely shorter than the spacing from the left-hand side member 5. In the case of a frontal collision of the car front 1 against an obstacle 12, which only partly overlaps the width of the car front 1 on the left-hand drive side, the engine 6 is not involved in frontally absorbing the collision forces. Instead, the kinetic energy of the collision has to be absorbed entirely by the supporting structure of the car front 1 on the collision side. In this case, the central end cross-member 9 can contribute little to the involvement of the engine 6 in the collision stress, because the moment of resistance of its cross-section is too small. However, in the case of a frontal stressing of the engine 6 during a head-on collision, the central end cross-member 9, located in front of the passenger cell in the bifurcate member region does participate in absorbing the energy of collision. The load capacity of this end cross-member 9 should not be underestimated, because it is rigidly connected to load-bearing profiles of the vehicle safety cell, such as the cross-member beneath the windshield. Morever, a participation of this end cross-member 9 in the absorption of energy has a substantial influence upon the space enclosed by the bifurcate members 4 at collision intensities at which the safety cell itself is involved in the deformation due to the collision. The so-called survival space of the passenger cell is therefore threatened much less in the case of a frontal collision than if a collision of an affected side of the vehicle were to occur.

In order to permit this conjoint stressing of the engine 6 in spite of a laterally offset collision, a tenson band 13 is arranged between the left-hand unit member 5 and the crank casing of the engine 6. The tension band 13 consists of a flexible wire cable which is sheathed with plastic in order to prevent noise and corrosion. The ends of the wire cable are provided with massive connecting eyes 14 which are connected permanently to the wire cable. The connecting eyes 14 are made of bright metal and penetrated by fastening screws 15 whereby the connecting eyes 14 are screwed to the unit member 5 and to the engine 6.

This arrangement permits the tension band 13 to be used both as a bracing means and as a ground cable for the vehicle.

The tension band 13 at its front engine-side end is attached to the crank casing somewhat in front of the engine cross-member 10 and extends obliquely to the rear where it is attached at its rear end to the unit member 5 in proximity to the point of the bifurcated member 4. The tension band 13 extends closely beneath the engine cross-member 10, and one or both of the fastening points are located vertically higher than the actual engine cross-member 10. At the same time, the tension band 13 is positioned with sufficient play to allow the engine 6 to be unrestricted in its vibrational mobility. Moreover, the positioning of the tension band 13 provides that it should attain its force-absorbing tensioned portion when the straight side member 5 has its fastening point 14 moved approximately 30 mm to the rear in the course of an offset crash.

The arrangement of the fastening point for the tension band 13, as well as the strength of the tension band is chosen so that the tension band 13 is constrained to bend the engine cross-member 10 upwards in the final phase of the tensioning process. This produces a substantial preliminary load in the form of a cable tensile stress which therefore influences the terminal fastenings 14. After the stretched position of the tension band 13 is attained, this preliminary load merges directly, with increasing deformation of the straight side members 5 during a collision, into a principal load which causes the engine 6 to be braced upon the control end cross-member 9, which is then plastically deformed. The entire engine-side deformation load is thereby prevented from occurring abruptly on the engine-side fastening 14 of the tension band 13, which would undeniably result in the screw fastening 15 being torn out of the cast crank casing. On the other hand, the danger of the unit-member-side screw fastening 14 being torn out scarcely exists, because a welded nut is provided which could alleviate the load shock during the absorption of force by the tension band 13 by plastic deformation of the welded nut seat.

Thus, through appropriate dimensioning of the unit-side screw fastening, the preliminary load necessary for the engine-side fastening is obtained.

Alternative, to the above described arrangement of the tension band 13 of FIG. 1, it is conceivable to position the latter with a greater transverse orientation. This greater transverse orientation positioning is indicated by chain-dotted lines of a tension band 13'. The engine-side screw fastening in this case is provided just behind the engine cross-member 10 in proximity of the inclined engine side beneath the crank case. Starting from this screw fastening, the tension band 13' extends very obliquely to the left, where it is screwed at its rear end to the end face of a steering gear housing 16, which is connected rigidly to the straight side unit member 5 just in front of the bifurcate member 4. The resulting axial directions for the screw fastenings extend transversely to the tensioning direction of the tension band 13', so that the fastening screws are stressed predominantly in shear and hardly at all in tension.

Due to the fastening of the steering gear housing 16 to the left-hand straight side unit member 5, the housing-side screw fastening is likewise moved to the rear upon crushing of the unit member 5. After tightening of the traction band 13' and further deformation of the unit member 5, the engine unit becomes stressed pivotally about a vertical axis due to the direction of tension of the tension band 13', while it is drawn closer to the deformed straight side unit member 5. In case this pivotal movement is not possible during a collision by reason of the lateral spacing between the engine 6 and a deformed straight side member 5 being reduced by deformation, for example, then the engine unit 2 is at least prevented from crushing the foot space in the passenger cell on the driver side located at the housing of the gearbox 8 by a movement towards the side remote from the crash. Conjoint utilization of the end wall to absorb energy of collision is also ensured by the tension band 13' irrespectively of the pivoting process of the engine unit.

In addition to the tension band 13, a further tension band 13', which is indicated by dash lines, may be provided in an approximately mirror image arrangement to that shown in FIG. 1, but on the right-hand side of the car front 1. This tension band arrangement on both sides is particularly convenient if the engine 6 is installed approximately at right angles and centrally in the engine compartment 3, because in this case the risk of a right-hand offset crash without stressing of the engine is greater than in the case of its illustrated off center installation position.

The tension bands 13 and 13' may alternatively each be replaced by a tension band configuration in which a deformation element is integrated into the tensioning length of the tension band as will be explained later.

FIG. 2 illustrates a tension band 17, which is likewise formed by a sheathed wire cable which is attached to the engine 6 and to the straight side unit member 5 in corresponding manner to the tension band 13 of FIG. 1. In contrast to the latter, however, it is longer and is positioned meander-shaped in two loops in the central region. These loops, located juxtaposed, are surrounded by a rectangular cable joint 18, and thereby fixed in position. The cable joint 18 is a sheet metal part folded in a U-shape, the base surface of which faces downwardly of the vehicle and is provided with two transverse bolts 19 spaced apart longitudinally and laterally and projecting upwardly from the base at right angles. After the wire cable has been wound round the transverse bolts 19 in order to form the loops, the upright walls of the U of the cable joint 18 are again folded around and over the loops parallel to the base of the U-shape, so that an overall bending of approximately 180° is obtained. The slightly mutually overlapping walls are then pressed downwardly towards the base of the cable joint 18, so that the loop region of the tension band 17 is located firmly surrounded between the folded walls and the base of the U-shaped cable joint 18.

By virtue of this construction, the tension band 17 can only be extended into a straight stretched position by the cable joint 18 being open under a tensile stress with the transverse bolts 19 located on a line joining the terminal fastening points of the tension band 17. This would require the inner bolt 19 to move forward and the outer bolt 19 to move rearwardly. The energy of plastic deformation necessary for this is utilized as a preliminary load for the engine-side fastening of the tension band 17.

According to the embodiment of FIG. 3, there is a flexible tension band 20, the front end of which is screwed to the engine 6, and which is provided for the provision of this preliminary load. The rear end of the wire-cable-like tension band 20 is constructed in the manner of a piston rod into a deformation cylinder 21 and connected firmly to a displacer piston 22. The deformation cylinder 21 is screwed beneath the steering gear housing 16 by means of an integrally shaped strap 23 on the straight side unit member 5, which extends forwardly approximately parallel to the straight side unit member 5. The displacer piston 22 thus occupies an initial position close to the rear fastened cylinder end. The cyinder bore, stressable by the displacer piston 22, is filled with a solid plastic material 24. The displacer piston 22 is also overdimensioned relative to the cylinder bore and engages positively peripherally into a wedge-shaped annular groove 25 hollowed out of the cylinder wall.

In the case of a tensile stressing of the tension band 20, the deformation cylinder 21 is first of all drawn into its stretched position by the tension band 20 as it is pivoted away from the unit support 5 by bending at the strap 23.

Then, in the case of further collision stressing of the straight side unit member 5, the displacer piston 22 is drawn through the deformation cylinder 21 until it has attained its limit position in the deformation cylinder 21 and is located by the end of the cylinder. After this combination of bending and piston movement, the tension band 20 and the deformation cylinder 21 can absorb the principal load of engine bracing.

When the displacement piston 22 slides forward in the deformation cylinder 21, its cylinder wall is widened plastically so the plastic material 24 can flow out around the displace piston 22 to the rear. By virtue of this construction, a relatively high preliminary load can be exerted upon the engine-side screw fastening. Alternatively, however, it is likewise conceivable to omit the plastic material 24, and instead to taper the deformation cylinder 21 to a smaller inside diameter in front of the displacer piston 22.

Lastly, FIG. 4 shows an embodiment of a tension band 28 in which a wire cable, of identical construction to the tension band 13 of FIG. 1, is attached to the straight side unit member 5 through the intermediary of a bending open device. This bending open device is formed by two flat irons 26 which are mutually connected flexurally rigidly at a forward facing end. The wide sides of the flat irons 26, 27 are located juxtaposed virtually in an overlapped longitudinally extending plane, so that it is possible to cut a wider flat iron in the longitudinal direction and to construct the two flat iron members in this way. It is also possible to provide only a partial cut, or notch-shaped incision, along the rear length of the flat iron member 27 connected to the tension band 13 so as to provide the portion for connection 14.

In order that the flat irons 26 and 27 require little installation space, the wide side of the flat iron 26 is screwed to the straight side unit member 5, with the flat iron 27 located vertically above the flat iron 26. The flat iron 27, which is screwed only indirectly to the straight side member 5, is angled forward through approximately 180° at its free end and screwed to the rear end of the tension band 13 at connection 14.

During the stretching process of the tension band 13, the described bending open device can be spread open until the flat irons 26 and 27 are located in a straight line and in longitudinal alignment with the tensioned wire cable. The plastic deformation of the bending open device then provides the required preliminary load. Because no further flexural deformation of the bending open device is then possible, the principal load can be transmitted.

In addition to those explained, further known deformation elements are also conceivable as means to generate the preliminary load. Thus, for example, one or more chain-link-like deformation elements may be included in the length of the tension cable.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Bracing structure for a vehicle having a resiliently front mounted engine and vehicle body structures which are deformed with absorption of energy upon collision and which has a longitudinally extending tension band means fastened at one end to the engine and at another end to the vehicle body structure located laterally adjacent the engine for resisting excess deformation of the vehicle body structure by a collision;

said tension band means comprising a flexible tension cable at least along a part of its length and being tensioned between its end fastenings by absorption of collision forces after an initial partial deformation of the vehicle body structure to which the other end is connected.

2. Bracing structures according to claim 1, wherein said one end is fastened to a side of the engine so that the engine is stressed pivotally by the tension band means upon tension loading during absorption of collision forces.

3. Bracing structure according to claim 1, wherein there are two tension band means arranged in approximately mirror image on each of two sides of the vehicle and with each tension band means being fastened between the engine and an associated lateral vehicle body wall.

4. Bracing structure according to claim 1, wherein the tension band means provides an electrically conductive ground connection between the vehicle body and the engine.

5. Bracing structure according to claim 1, wherein the tension band means comprises a plastic sheathed wire cable with terminal screw eyes at each end for the fastening of the tension band means.

6. Bracing structure according to claim 1, wherein there is at least one deformation element means attached to on the tension band means which inhibits the tensioning process of the tension band means.

7. Bracing structure according to claim 6, wherein a central region of the flexible tension band means is curvingly wound around two transverse bolts of a cable joint of said deformation element means to form tension band loops, which loops are pressed together by means of the cable joint so that the tension band means is transferable into a stretched tensioning position only by a plastic bending open of the cable joint.

8. Bracing structure according to claim 6, wherein said another end of the tension band means is formed by a cylinder of said deformation element means, which cylinder is arranged on the vehicle body; a displacer piston means located inside said cylinder and connected to said flexible cable extending out of the cylinder in the manner of a piston rod; and wherein the displacer piston means can be drawn into a limit position in the cylinder counter to a plastic material deformation.

9. Bracing structure according to claim 6, wherein two juxtaposed flat iron means of said deformation element means are provided as tension band receivers, and are mutually connected to one another in a rigid but flexible joint located toward the front end of the vehicle; one end of the flat iron means being fastened at a rear-most end to the vehicle body; the other flat iron means being fastened at its rear-most end to the engine by means of said tension band means so that the pair of flat iron means are spreadable away from one another at the rigid but flexible joint with plastic deformation.

* * * * *